United States Patent [19]

Peterson

[11] Patent Number: 5,001,406
[45] Date of Patent: Mar. 19, 1991

[54] BRUSHLESS DC MOTOR SPEED CONTROL VIA POWER SUPPLY VOLTAGE LEVEL CONTROL

[75] Inventor: Donald S. Peterson, Philomath, Oreg.

[73] Assignee: Spectra-Physics, Inc., San Jose, Calif.

[21] Appl. No.: 260,008

[22] Filed: Oct. 19, 1988

[51] Int. Cl.⁵ .......................................... H02K 29/00
[52] U.S. Cl. .................................... 318/254; 318/138
[58] Field of Search .......... 318/135, 139, 254, 254 A, 318/255, 615, 628, 661, 596, 696

[56] References Cited

U.S. PATENT DOCUMENTS

| | | | |
|---|---|---|---|
| 3,560,821 | 2/1971 | Beling . | |
| 3,896,357 | 7/1975 | Tanikoshi | 318/254 A |
| 4,119,895 | 10/1978 | Müller | 318/254 A |
| 4,135,120 | 1/1979 | Hoshimi et al. | 318/254 A |
| 4,295,085 | 10/1981 | Lafuze | 318/138 X |
| 4,672,274 | 6/1987 | Suganuma | 318/138 X |
| 4,680,515 | 7/1987 | Crook | 318/138 X |
| 4,686,437 | 8/1987 | Langley et al. | 318/138 X |
| 4,709,195 | 11/1987 | Hellekson et al. . | |

Primary Examiner—William M. Shoop, Jr.
Assistant Examiner—A. Jonathan Wysocki
Attorney, Agent, or Firm—Killworth, Gottman, Hagan & Schaeff

[57] ABSTRACT

The operating speed of a brushless DC motor is maintained at a desired speed by controlling the voltage level of power supplied to the motor. The motor includes a rotor carrying permanent magnets, cooperating electromagnets contained in a stationary armature and Hall effect devices for sensing the operating speed and position of the rotor. Circuitry connected to the Hall effect devices generates angular sector signals corresponding to activation periods or periods during which power is applied to the electromagnets to operate the motor. A processor connected to one of the Hall effect devices monitors the operating speed of the motor and generates an error signal representative of the difference between the operating speed of the motor and a desired reference speed. A power supply is controlled by the processor to generate power having a voltage level corresponding to the error signal. Switching transistors are connected between the electromagnets and the circuitry for generating the angular sector signals to apply power from the power supply to each of the electromagnets during the entirety of its corresponding activation period to maintain the motor speed at the desired reference speed.

6 Claims, 2 Drawing Sheets

BRUSHLESS DC MOTOR SPEED CONTROL VIA POWER SUPPLY VOLTAGE LEVEL CONTROL

BACKGROUND OF THE INVENTION

The present invention relates generally to brushless DC motors and, more particularly, to a speed control for a brushless DC motor wherein the speed of the motor is controlled by the voltage level of the power applied to it.

In a brushless DC motor, the rotor carries permanent magnets and requires no electrical connection. Cooperating electromagnets, which are repeatedly activated to drive the motor, are contained in a stationary armature. Power transistors are operated to activate the electromagnets in the proper timing sequence to drive the motor at a desired speed.

For sensing of the speed and position of the rotor of a brushless DC motor, stationary Hall effect devices are positioned adjacent to the rotor such that they are activated by the permanent magnets carried thereon. The Hall effect devices generate signals which are ultimately used to control the power transistors to generate correct timing of power pulses to the electromagnets. Logic circuitry associated with the motor receives the output signals from the Hall effect devices and processes the signals to turn on the correct power transitor at the correct time.

Usually, a desired speed is maintained in a brushless DC motor by pulse width modulation of power which is provided to the electromagnets. The power is provided as a voltage which is higher than that necessary to maintain the desired motor speed and then the pulse width is modulated such that the power delivered to the electromagnets is sufficient to maintain the desired speed of the brushless DC motor. Unfortunately, high frequency switching of the power to the electromagnets generates hysteresis and eddy current losses and electromagnetic interference (EMI). Since the motors frequently have leads of some length which serve as effective transmitters for the EMI. this is a particularly serious problem in equipment which is to be economically housed, for example in a plastic cabinet which provides no EMI shielding.

Consequently, there is a need for a method and apparatus of controlling the speed of a brushless DC motor which elminates the switching and resulting problems associated with pulse width modulation in the prior art speed controls for such motors.

SUMMARY OF THE INVENTION

The power consumption and EMI problems associated with prior art brushless DC motor speed controls are overcome in accordance with the present invention by eliminating pulse width modulation of the signals used to control the motor. In accordance with the method and apparatus of the present invention, the speed of a brushless DC motor is monitored and angular sector signals are generated which correspond to the activation periods for applying power to electromagnets contained in a stationary armature of the motor. The monitored speed of the motor is compared to a desired reference speed, such that an error signal representative of the difference between the speed of the motor and the reference signal can be generated. The voltage level of a power supply which is connected to each of the electromagnets during the entirety of its activation period is controlled in response to the error signal such that the speed of the motor is controlled by controlling the voltage level of the power applied to the electromagnets rather than by modulating the pulse widths of a fixed voltage power supply as in the prior art.

In accordance with one aspect of the present invention, a method for controlling the operating speed of a brushless DC motor which includes a rotor carrying permanent magnets and cooperating electromagnets contained in a stationary armature comprises the steps of: (a) monitoring the operating speed of the motor; (b) generating angular sector signals corresponding to the activation periods for applying power to the electromagnets to operate the motor; (c) applying power to each of the electromagnets during the entirety of its activation period; (d) comparing the operating speed of the motor to a desired reference speed; (e) generating an error signal representative of the difference between the operating speed of the motor and the reference speed; and (f) controlling the voltage level of the power applied to the electromagnets in response to the error signal to thereby control the operating speed of the motor.

The method of the present invention for controlling the operating speed of a brushless DC motor may further comprise the step of (g) monitoring the acceleration of the motor such that the step (e) of generating an error signal is further responsive to the acceleration of the motor. Preferably, when the acceleration is monitored, the error signal generated in accordance with step (e) remains unchanged if the motor speed is too slow but the motor speed is increasing, or the motor speed is too fast but the motor speed is decreasing.

In accordance with another aspect of the present invention, apparatus for controlling the operating speed of a brushless DC motor which includes a rotor carrying permanent magnets cooperating electromagnets contained in a stationary armature and Hall effect devices for sensing the operating speed and position of the rotor comprises circuit means for generating angular sector signals corresponding to the activation periods for applying power to the electromagnets to operate the motor. Regulator means connected to at least one of the Hall effect devices monitors the operating speed of the motor and generates an error signal representative of the difference between the operating speed of the motor and a desired reference speed. Power supply means connected to the electromagnets and the regulator means generates power having a voltage level responsive to the error signal. Switching means connected between the electromagnets and the circuit means applies power from the power supply to each of the electromagnets during the entirety of its activation period to correspond the motor operating speed to the desired reference speed.

The power supply means may comprise a switching power supply and the error signal may have a frequency which is a function of the difference between the operating speed of the motor and the desired reference speed. Preferably, the regulator means further monitors the acceleration of the motor for generating the error signal such that the error signal remains unchanged if the motor speed is too slow but the motor speed is increasing, or the motor speed is too fast but the motor speed is decreasing.

It is a primary object of the present invention to provide a method and apparatus for controlling the operating speed of a brushless DC motor by means of controlling the voltage level of the power applied to electromagnets contained in a stationary armature of the motor in accordance with the monitored operating speed of the motor with the power being applied to each of the electromagnets during the entirety of its activation period to thereby reduce power consumption and EMI problems associated with prior art pulse width modulation speed control arrangements.

Other objects and advantages of the invention will be apparent from the following description, the accompanying drawings and the appended claims.

DETAILED DESCRIPTION OF THE INVENTION

Brushless DC motors are utilized in a variety of applications. One relatively recent application which has been very advantageous in bar code scanners as illustrated by U.S. Pat. No. 4,709,195 which was issued to Hellekson and Peterson on Nov. 24, 1987, is assigned to the same assignee as the present application and is hereby incorporated by reference.

In spite of the substantial improvement made in bar code scanners by utilizing brushless DC motors various problems remain, particularly due to the high frequency switching of power to the electromagnets of the motors which generate hysteresis and eddy current losses and EMI. Since the motors frequently have leads of some length when used in bar code scanners. EMI is a particularly serious problem when the equipment is to be economically housed, for example in a plastic cabinet which provides no EMI shielding.

Figure 1:
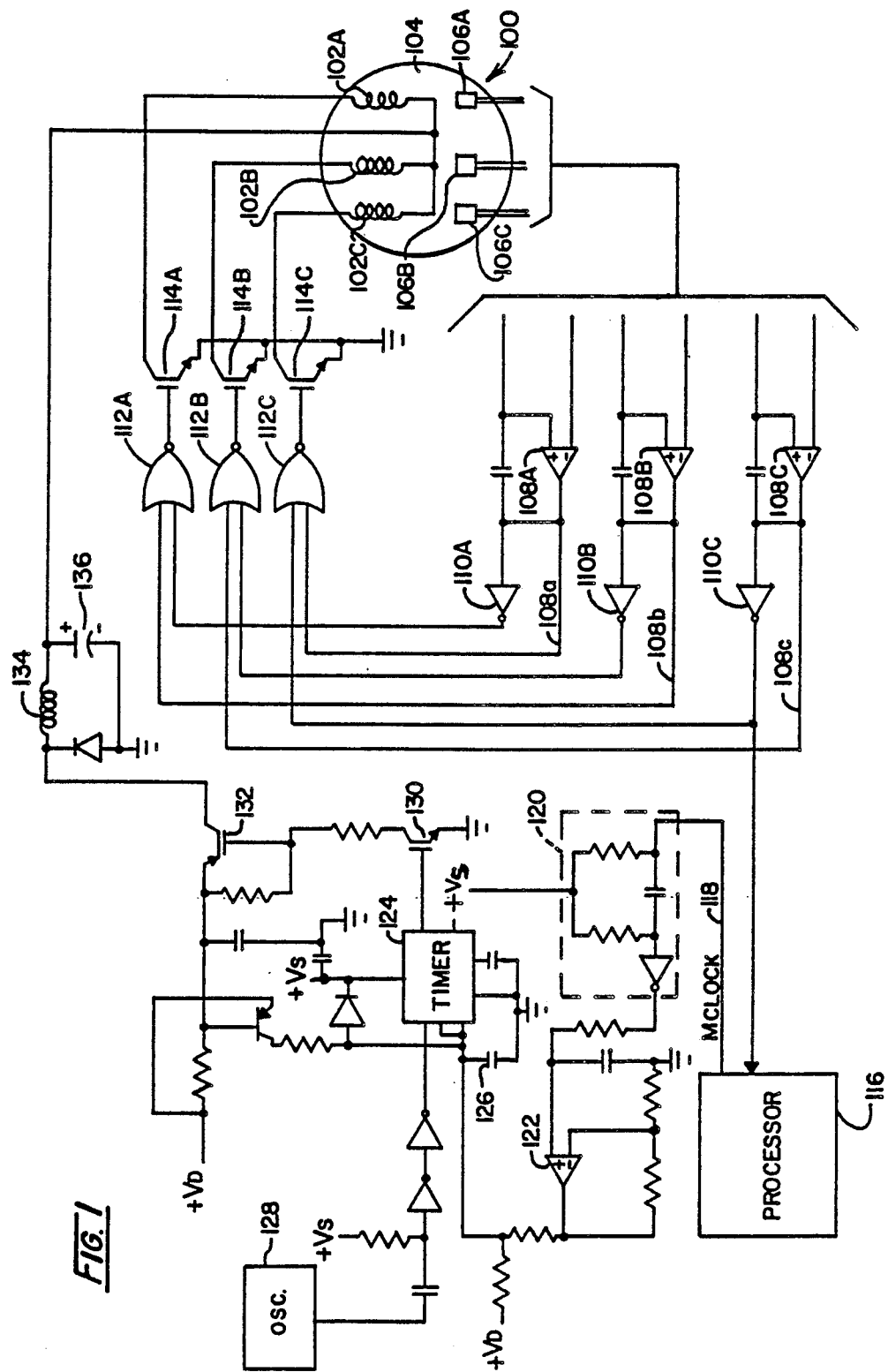
FIG. 1 is a schematic diagram of a voltage speed control circuit for a brushless DC motor in accordance with the present invention.
Figure 2:
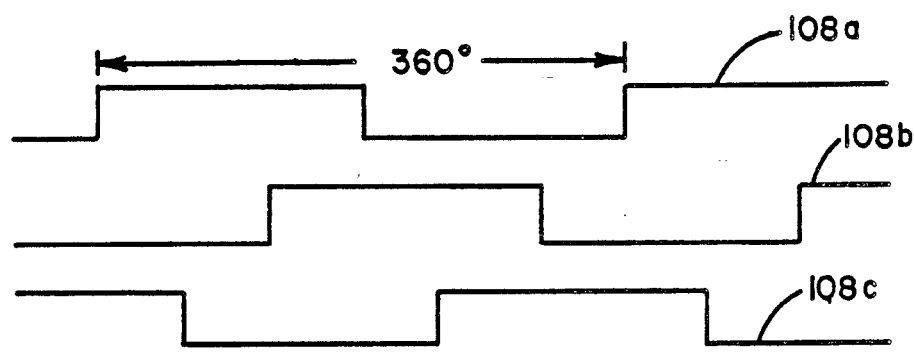
FIG. 2 is a timing chart illustrating signals generated by Hall effect devices which sense the speed and position of the rotor of a brushless DC motor.

The present invention overcomes these problems by eliminating pulse width modulation of the motor power supply, i.e. the high frequency switching of the power to the electromagnets. As shown in FIG. 1, a brushless DC motor 100 includes three electromagnets 102 contained in a stationary armature 104. The electromagnets 102 are driven to rotate a rotor (not shown) carrying permanent magnets and therefore requiring no electrical connection. Three stationary Hall effect devices 106 are positioned adjacent to the rotor such that they are activated by the permanent magnets carried thereon for sensing the speed and position of the rotor. The Hall effect devices 106 generate the signals shown in FIG. 2, which signals are passed to three operational amplifiers 108. The amplifiers 108 in turn amplify those signals and also provide corresponding inverted signals by means of three inverters 110.

Figure 3:
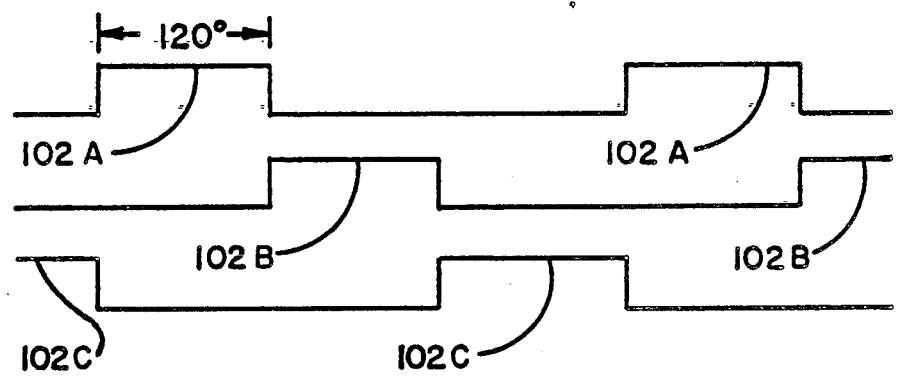
FIG. 3 is a timing diagram illustrating the angular sector signals corresponding to the activation periods for applying power to the electromagnets of a brushless DC motor to operate the motor.

The direct and inverted signals from the Hall effect devices 106 are passed to circuit means comprising three NOR gates 112 which combine the signals to generate angular sector signals shown in FIG. 3 corresponding to the activation periods for applying power to the electromagnets 102 to operate the brushless DC motor 100. Switching means comprising transitors 114 are connected between the electromagnets 102 and the NOR gates 112 for applying power to each of the electromagnets 102 during the entirety of its activation period.

Regulator means comprising a processor 116 is connected to at least one of the Hall effect devices 106 via its corresponding operational amplifier 108 for monitoring the operating speed of the motor 100 and for generating an error signal representative of the difference between the operating speed of the motor and a desired reference speed. In a working embodiment of the present invention, the processor 116 comprised a National Semiconductor HPC 46003. Of course, any general purpose digital processor having sufficient capacity could be utilized in the present invention.

The processor 116 measures the motor speed by determining the period of the signal from the Hall effect device 106 which is monitored, with a smaller measured period indicating faster motor speed. The motor speed is controlled by varying the period of an Mclock signal which is passed from the processor 116 to the motor drive circuit via a conductor 118. A smaller Mclock period results in a slower motor speed. The period of the Hall effect device signal is determined by counting the number of transitions of the Hall effect device signal during a designated period of time. This value is designated $T_H$. The desired reference speed is represented by a corresponding period designated $T_{ref}$.

The measured value of the motor speed $T_H$, is compared to the desired value of the motor speed. $T_{ref}$, to determine if the motor is operating faster or slower than the desired reference speed. $TH_H$ is also compared to the value of $T_H$ which was measured during the previous time period to determine if the motor is slowing down or speeding up. If the motor is running too fast but is slowing down, no action is taken. If the motor is running too slow but is speeding up, no action is taken. However, if the motor is running too slow and is slowing down, the Mclock period is increased to speed up the motor, and if the motor is running too fast and is speeding up, the Mclock period is decreased to slow down the motor.

Such operation acts to gradually drive the brushless DC motor 100 to the desired reference speed. Since the speed controller of the present invention is intended for initial use with a bar code scanner, the system has no need to rapidly adjust to perturbations such that a gradual control response is acceptable. For this application the value of $T_{ref}$ is around 7.5 msec so the rate of change is slow. The Mclock signal is initially set to 1100 hertz to start the operation of the motor 100. Once the motor 100 is up to speed such that its speed can be controlled in accordance with the present invention, the Mclock signal is reduced to 1000 hertz. Changes in the Mclock signal are made to increase or decrease the period of the Mclock signal by one clock cycle of the processor 116, which is approximately 1 μsec. The following program has been used to control an HPC 46003 to generate the Mclock signal in a working embodiment of the invention.

```
6927                    .LIST 1
6928            ;*************************************************************
6929            ;* This interrupt is used to regulate the speed of the motor. The motor speed
6930            ;* is measured by capturing the period of the Hall switch signal from the motor
6931            ;* (a smaller measured value indicated faster motor speed). The motor speed is
6932            ;* controlled by varying the period of the Mclock signal from the HPC to the
6933            ;* motor drive circuit. A smaller Mclock period results in slower motor speed.
6934            ;* The interrupt sertvice routine is in two parts. The first part counts
6935            ;* the number of "ticks" (in 1.085 usec or 667 nsec units) between hall
6936            ;* switch interrupts...designated 'Th'. The measured value of Th is
6937            ;* compared to the desired hall period Tref (loaded from EEPROM) to determine
6938            ;* if the motor is too fast or too slow. Th is also compared to the value of
6939            ;* Th which was measured at the previous hall interrupt to determine if the
6940            ;* motor is slowing down or speeding up. If the motor is too fast, but is
6941            ;* slowing down, no action is taken. If the motor is too slow, but is
6942            ;* speeding up, no action is taken. If the motor is too slow and is slowing
6943            ;* down, the Mclock period is increased (to speed the motor up). If the motor
6944            ;* is too fast and is speeding up, the Mclock period is decreased (to slow the
6945            ;* motor down). This method acts to gradually drive the motor to the correct
6946            ;* speed. The system doesn't have a need to rapidly adjust to perturbations,
6947            ;* so a slow response is OK. The value of Th is around 7.5 msec, so the rate
6948            ;* of change is slow.
6949            ;*
6950            ;* Th is tested to determine if the motor is too fast or too slow compared to
6951            ;* limits loaded from the EEPROM. If the Mclock value has been changed, it is
6952            ;* compared to limits before being updated.
6953            ;*
6954 E4DA      hallsk:
6955 E4DA 3001       jsr    hall_interrupt        ; MEASURE DURATION BETWEEN HALL
6956 E4DC 3E         reti                         ; INTERRUPTS - Th
6957
6958 E4DD      hall_interrupt:
6959 E4DD 97FBD2     ld     irpd.b,#0xFB          ; Clear I2 flag here! This may be called as
6960 E4E0 AFC8       push   A                     ; a subroutine from within the IBM 4683
6961 E4E2 AFCC       push   B                     ; interrrupt service.
6962 E4E4 AFC0       push   pswloc.w
6963 E4E6 860184A8   ld     A,i2cr.w              ; get new count
6964 E4EA ABCC       st     A,bloc.w
6965 E4EC AEAA       x      A,old_cnt.w           ; move new_cnt into old_cnt, get old_cnt
6966 E4EE AECC       x      A,bloc.w              ; B = old_cnt   A = new_cnt
6967 E4F0 02         sc
6968 E4F1 96CCEB     subc   A,bloc.w              ; new_cnt - old_cnt = delta_cnt Th
6969 E4F4 ACA8CC     ld     B,delta_cnt.w         ; get old Th value
6970 E4F7 ABA8       st     A,delta_cnt.w         ; store new Th value
6971 E4F9 969509     sbit   motor_ok,CCR.b
6972            ;*
6973 E4FC      hall_tst:
6974 E4FC 96A6FD     ifgt   A,motor_minp.w
6975 E4FF 51         jp     hall_tstA             ; motor too fast ?
6976 E500 969610     ifbit  hall_err,CCR1.b
6977 E503 45         jp     hte_fast
6978 E504 969608     sbit   hall_err,CCR1.b
6979 E507 9425       jmp    hall_calc
6980 E509      hte_fast:
6981 E509 B5F9A6     jsrl   motor_off
6982 E50C 9075       ld     A,#0x75               ; "u"
6983 E50E B4F6F5     jmpl   beep_err
6984            ;*
6985 E511      hall_tstA:
6986 E511 969612     ifbit  motor_calc,CCR1.b     ; do too slow test ?
6987 E514 41         jmp    hall_tstB
```

```
6988 E515 55              jp      hall_tstD           ; no...
6989 E516         hall_tstB:
6990 E516 96A4FD          ifgt    A,motor_maxp.w      ; motor too slow ? ( delta_cnt > motor_maxp )
6991 E519 41              jp      hall_tstC
6992 E51A 50              jmp     hall_tstD
6993 E51B         hall_tstC:
6994 E51B 969610          ifbit   hall_err,CCR1.b
6995 E51E 44              jp      hte_slow
6996 E51F 969608          sbit    hall_err,CCR1.b
6997 E522 4B              jp      hall_calc
6998 E523         hte_slow:
6999 E523 B5F98C          jsrl    motor_off
7000 E526 9074            ld      A,#0x74             ; "t"
7001 E528 B4F6DB          jmpl    beep_err
7002 E52B         hall_tstD:
7003 E52B 969618          rbit    hall_err,CCR1.b
7004
7005                      ;**************************************
7006 E52E         hall_calc:                          ; check if too fast or too slow
7007 E52E A0C8CCFD        ifgt    B,A.w               ; old Th >= new Th?
7008 E532 4E              jp      hall_calc2a
7009 E533 96ACFD          ifgt    A,Tref.w            ; slowing down- check if too slow (Th > Tref)?
7010 E536 41              jp      hall_calc1          ; yes -too slow
7011 E537 59              jp      hall_calc4          ; no - exit
7012 E538         hall_calc1:
7013 E538 B6014EA8        ld      A,r7.w              ; yes - slowing down and too slow - adjust Mclock
7014 E53C 04              inc     A                   ; change Mclock value
7015 E53D 9C00            ifeq    A,#0
7016 E53F 51              jp      hall_calc4          ; don't update if Mclock value overflows to zero
7017 E540 4C              jp      hall_calc3
7018 E541         hall_calc2a:                        ; yes .. speeding up
7019 E541 96ACFD          ifgt    A,Tref.w            ; old Th >= new Th?
7020 E544 4C              jp      hall_calc4          ; speeding up and too slow - exit
7021 E545         hall_calc2b:
7022 E545 B6014EA8        ld      A, r7.w
7023 E549 9C00            ifeq    A,#0
7024 E54B 45              jp      hall_calc4          ; don't allow to underflow past zero
7025 E54C 05              dec     A                   ; change Mclock value
7026 E54D         hall_calc3:
7027 E54D B6014EA8        st      A,r7.w              ; adjust motor with new Tout[n]
7028 E551         hall_calc4:
7029 E551 3FC0            pop     psuloc.w
7030 E553 3FCC            pop     B
7031 E555 3FC8            pop     A
7032 E557 3C              ret
```

The Mclock signal generated by the processor 116 is passed to a one shot circuit 1230 which generates a pulse train of constant width and variable frequency which is passed to an operational amplifier 122. The output signal from the operational amplifier 122 is a DC voltage which is proportional to the frequency of the pulse train passed to the operational amplifier 122 and hence the error signal determined by the processor 116. A 555 timer circuit 124 is connected as a one shot with the on time corresponding to the charge time of a capacitor 126. A 30 kilohertz signal is generated by an oscillator 128 and passed to the trigger input of the timer circuit 123 such that the capacitor 126 is charged or samples the DC voltage at the output of the operational amplifier 122 at a 30 kilohertz frequency or every 33 μsec. The timer pass drive voltage $V_D$ to a tiler comprising an inductor 134 and a capacitor 136. Accordingly, the voltage which is generated on the capacitor 136 is controlled by the operating speed of the brushless DC motor 100 such that the motor 100 receives only enough voltage to achieve its desired speed.

Having described the invention in detail and by way of reference to preferred embodiments thereof, it will be apparent that other modifications and variations are possible without departing from the scope of the invention defined in the appended claims.

What is claimed is:

1. A method for controlling the operating speed of a brushless DC motor which includes a rotor carrying permanent magnets and cooperating electromagnets contained in a stationary armature, said method comprising the steps of:

(a) monitoring the operating speed of said motor;
(b) generating angular sector signals corresponding to the activation periods for applying power to said electromagnets to operate said motor;
(c) applying power to each of said electromagnets during the entirety of its activation period;
(d) comparing the operating speed of said motor to a desired reference speed;
(e) generating an error signal representative of the difference between the operating speed of said motor and said reference speed; and
(f) controlling the voltage level of the power applied to said electromagnets in response to said error signal to control the operating speed of said motor.

2. A method for controlling the operating speed of a brushless DC motor as claimed in claim 1 further comprising the step of (g) monitoring the acceleration of said motor, and wherein the step (e) of generating an error signal representative of the difference between the operating speed o said motor and said reference speed is further responsive to the acceleration of said motor.

3. A method for controlling the operating speed of a brushless DC motor as claimed in claim 2 wherein the error signal generated in accordance with step (e) remains unchanged if the motor operating speed is too slow but the motor operating speed is increasing, or the motor operating speed is too fast but the motor operating speed is decreasing.

4. Apparatus for controlling the operating speed of a brushless DC motor with includes a rotor carrying permanent magnets, cooperating electromagnets contained in a stationary armature and Hall effect devices for sensing the operating speed and position of said rotor, said apparatus comprising:

circuit means coupled to said Hall effect devices for generating angular sector signals corresponding to activation periods for applying power to said electromagnets to operate said motor;

regulator means coupled to at least one of said Hall effect devices for monitoring the operating speed of said motor and for generating an error signal representative of the difference between the operating speed of said motor and a desired reference speed;

power supply means coupled to said regulator means for generating power having a voltage level corresponding to said error signal; and switching means coupled to said electromagnets and said circuit means for applying power from said power supply means to each of said electromagnets during the entirety of its activation period.

5. Apparatus for controlling the operating speed of a brushless DC motor as claimed in claim 4 wherein said power supply means comprises a switching power supply and said error signal has a frequency which is a function of the difference between the operating speed of said motor and said desired reference speed.

6. Apparatus for controlling the operating speed of a brushless DC motor as claimed in claim 4 wherein said regulator means further monitors the acceleration of said motor for generating said error signal such that said error signal remains unchanged if the motor operating speed is too slow but the motor operating speed is increasing, or the motor operating speed is too fast but the motor operating speed is decreasing.

* * * * *

UNITED STATES PATENT AND TRADEMARK OFFICE
CERTIFICATE OF CORRECTION

PATENT NO. : 5,001,406
DATED : March 19, 1991
INVENTOR(S) : Donald S. Peterson

It is certified that error appears in the above-identified patent and that said Letters Patent is hereby corrected as shown below:

| | | |
|---|---|---|
| Col. 1, Line 41, | "the EMI." should be --the EMI,--. |
| Col. 2, Line 20, | "and (f)" should be --and, (f)--. |
| Col. 4, Line 34, | "speed. $T_{ref}$," should be --speed, $T_{ref}$,--. |
| Col. 4, Line 36, | "speed. $TH_H$" should be --speed. $T_H$--. |
| Col. 7, Line 53, | "circuit 1230" should be --circuit 120--. |
| Col. 7, Line 64, | "circuit 123" should be --circuit 124--. |
| Col. 7, Line 67, | "The timer pass drive" should be --The timer circuit 124 in turn controls transistors 130 and 132 to pass drive--. |
| Col. 7, Line 67, | "to a tiler" should be --to a filter--. |
| Col. 9, Line 20, | "speed o said" should be --speed of said--. |
| Col. 9, Line 30, | "motor with" should be --motor which--. |

Signed and Sealed this

Twenty-second Day of December, 1992

Attest:

DOUGLAS B. COMER

*Attesting Officer*       *Acting Commissioner of Patents and Trademarks*